(12) United States Patent
Nelson et al.

(10) Patent No.: US 6,496,656 B1
(45) Date of Patent: Dec. 17, 2002

(54) CAMERA WITH VARIABLE SOUND CAPTURE FILE SIZE BASED ON EXPECTED PRINT CHARACTERISTICS

(75) Inventors: David J. Nelson, Rochester, NY (US); Jose A. Rosario, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 282 days.

(21) Appl. No.: 09/596,638

(22) Filed: Jun. 19, 2000

(51) Int. Cl.$^7$ .................. G03B 17/24; G03B 17/18; G03B 27/52
(52) U.S. Cl. ............... 396/312; 396/287; 396/311; 355/40
(58) Field of Search ............ 396/60, 287, 311, 396/312; 355/40; 348/232

(56) References Cited

U.S. PATENT DOCUMENTS

| | | |
|---|---|---|
| 5,128,700 A | 7/1992 | Inoue et al. |
| 5,276,472 A | 1/1994 | Bell et al. |
| 5,363,157 A * | 11/1994 | Cocca .................. 396/312 |
| 5,363,158 A * | 11/1994 | Stoneham ............. 396/312 |
| 5,471,265 A | 11/1995 | Shibata et al. |
| 5,489,955 A | 2/1996 | Satoh et al. |
| 5,530,473 A | 6/1996 | Sakai et al. |
| 5,530,501 A | 6/1996 | Bell |
| 5,692,225 A | 11/1997 | Barnardi et al. |
| 5,784,525 A | 7/1998 | Bell |
| 5,878,292 A | 3/1999 | Bell et al. |
| 6,163,656 A * | 12/2000 | Yoshioka ............... 396/312 |

\* cited by examiner

*Primary Examiner*—Alan A. Mathews
(74) *Attorney, Agent, or Firm*—Milton S. Sales

(57) ABSTRACT

A camera, adapted for recording individual sound files to be re-recorded onto associated photographic prints, includes an operator interface for pre-selecting photographic print characteristics which would affect the amount of recording time available on an associated photographic print. An audio memory is adapted to store sound files to be re-recorded onto associated photographic prints. An indicator is adapted to provide an operator-recognizable indication of recording time available as a function of print characteristics pre-selected by an operator. The print characteristics may include a print's two-dimensional surface area, a print's shape, a sound file's type or sound quality.

12 Claims, 3 Drawing Sheets

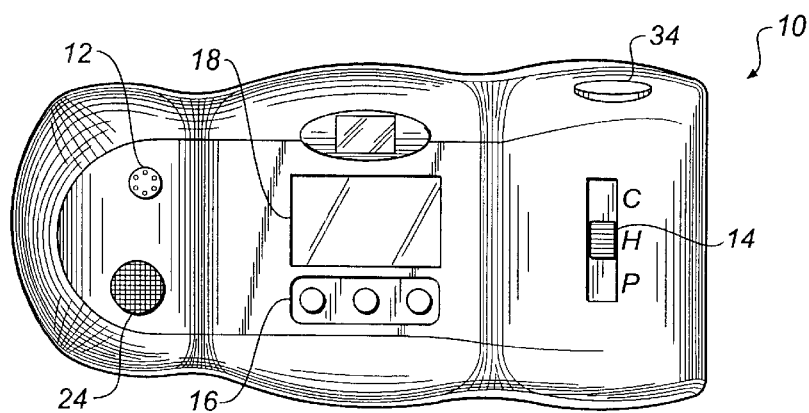
FIG. 1A
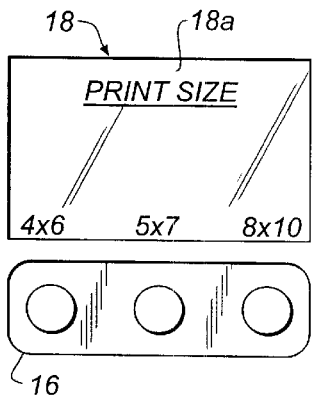
FIG. 1B
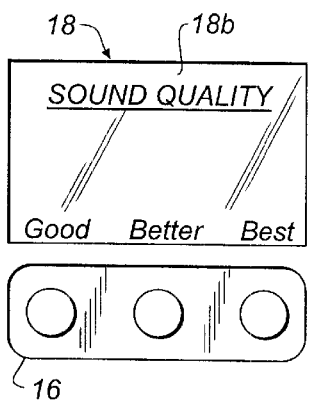
FIG. 1C
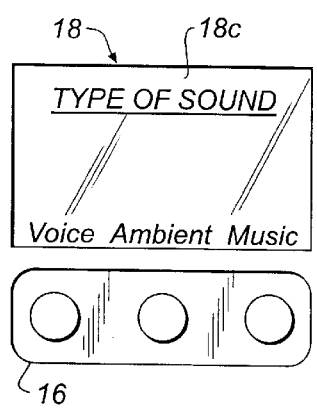
FIG. 1D
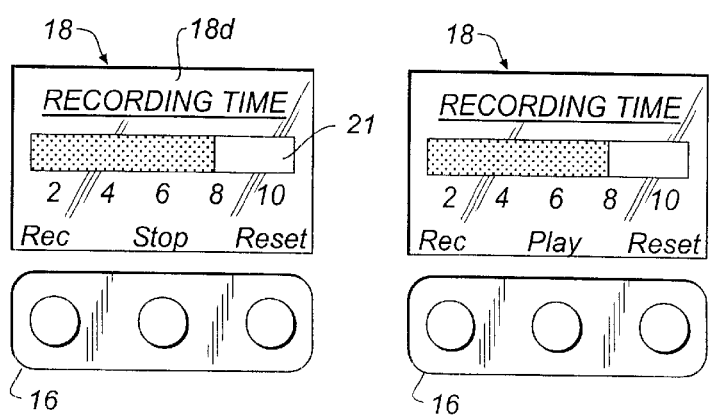
FIG. 1E
FIG. 1F

CAMERA WITH VARIABLE SOUND CAPTURE FILE SIZE BASED ON EXPECTED PRINT CHARACTERISTICS

FIELD OF THE INVENTION

This invention relates to photographic still cameras and photofinishing systems for providing audio recording and playback in association with individual still photographic prints, and more particularly to recording variable amounts of data in accordance with the expected characteristics of the print of the image being photographed.

BACKGROUND OF THE INVENTION

Cameras and systems for providing audio recording and playback in association with individual photographic still prints are known in the art. An example of such a system is disclosed in commonly assigned U.S. Pat. No. 5,276,472 to Bell et al., which describes a still photographic system with audio recording capability. Audio to be recorded in association with individual exposed frames is digitized and stored in a temporary memory in the camera. When the film is advanced to the next exposure frame, the stored digital audio signal is recorded on a magnetic layer on the film. At the photofinisher, the digital audio signal is read from the film and converted to a suitable format, such as a bar code or binary coded blister marks, which are impressed on the photoprint for subsequent playback.

Examples of such systems are disclosed in commonly assigned U.S. Pat. No. 5,692,225 to Bernardi et al. describes a system in which messages are stored in camera on-board memory or in detachable message memory modules or cards to be forwarded with an exposed film strip to a photofinisher for read out and printing on the prints. In the U.S. Pat. No. 5,128,700 to Inoue et al., the sound data is recorded in a first memory (e.g., a sound card) and data indicating correspondence between photographed frames of a film and the sound data is recorded in a second memory (e.g., a film).

Not all sound files or data files are the same size when printed as an invisible encodement. The area taken up by the encodement varies with the amount of data and the storage density, which in turn is a function of the resolving power of the printing and detection equipment used. Digital sound files that are moderately compressed and of more than one or two seconds in duration, represent relatively large printed encodements. While there is no space problem if an encodement is small relative to a related printed visible image, large encodements are problematic because, for a given encodement format, the encodement may not fit on the face of a related printed visible image.

There are many storage methods available for adding supplemental data to images, such as by using two-dimensional barcode printing on a print to record digital information. This method provides a limited area for the encodement. Accordingly, it is required that sound/data recorded has a limited size. If the sound files are too large when they are being added to the images, they must be edited before being added to the image. This procedure is cumbersome and requires a complex operator interface. Therefore for simplicity, there exists a need for limiting the size of a sound file at the recording stage.

In a camera, this file size can be set by shutting off the recording function after a given length of time. Therefore there is a need to limit the amount of recording time to coincide with the expected output print characteristics.

The area available for the encodement varies with the two-dimensional area of the print. Some camera formats, such as APS, provide for pre-selection of output print shape (height to width ratio). See for example U.S. Pat. No. 5,471,265 to Shibata et al.

It is known to restrict the allotted recording time, such as disclosed in commonly assigned U.S. Pat. No. 5,878,292 to Bell et al. or to provide the operator with a variable amount of recording time as in commonly assigned U.S. Pat. No. 5,530,501 to Bell. It is also known to display the amount of time remaining within which to record such as taught in U.S. Pat. No. 5,530,473 to Sakai et al. and U.S. Pat. No. 5,489,955 to Satoh et al, However it is not known to determine the amount of recording time available based upon the pre-selection of individual frame output print characteristics. All of the prior art sound recording limits are either arbitrarily set to a fixed amount of time, or are determined by storage limits which do not depend upon individual frame expected output print characteristics.

DISCLOSURE OF THE INVENTION

Given that there is a limited two dimensional area available on a print to record a sound file, it is required that any file to be recorded have a limited size. In a camera, this file size can be set by shutting off the recording function after a given length of time. This invention sets the limit for recording time based on operator-selected inputs on the camera. These inputs may include sound quality desired, type of sound to be recorded, and expected print shape and size. These operator-selected characteristics all influence the amount of recording time available. For example, the type of sound to be recorded, such as music, ambient sounds, or annotation, influences the preferred digital compression algorithm to be implemented at the photofinisher. The sound quality desired dictates the amount of allowable compression. The print format (such as for APS) or expected final print size provides the final image area that can be recorded upon in an over-the-image (or back-of-the-print) recording application.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG 1A shows camera according to the present invention

FIGS. 1B–1F show modified forms of a detail of FIG. 1A;

DETAILED DESCRIPTION OF THE INVENTION

Figure 2:
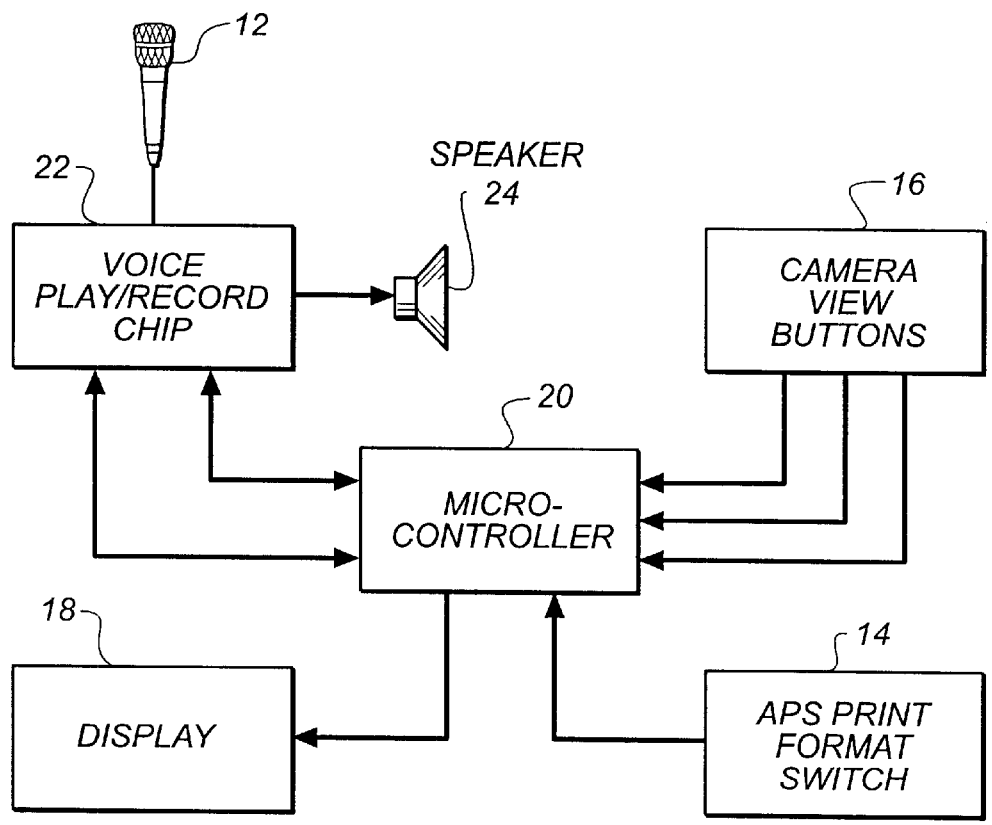
FIG. 2 is a block diagram showing a sound recording camera according to the invention and FIG. 3 is a flow diagram of the operation of the camera of FIG. 1.

The present description will be directed in particular to elements forming part of, or cooperating more directly with, apparatus in accordance with the present invention. It is to be understood that elements not specifically shown or described may take various forms well known to those skilled in the art. In the remainder of this disclosure, the recording device is considered to be an APS camera, but the invention can be applied to any format camera providing that a selection is present for input of expected output size.

Referring to FIGS. 1A–1F and 2, an APS camera 10 with sound recording capability includes a microphone 12. The basic functionality of a sound recording camera is well known, as shown in aforementioned U.S. Pat. No. 5,784, 525. Using a format selector switch 14, this camera would, by virtue of the APS system, already have the capability to select the shape of output prints. That is, APS formats are "C", "H", and "P". The "C" format is 4" by 6", the "H" format is 4" by 7", and the "P" format is 4" by 11". Format selector switch 14 performs the standard functions of altering the print format by recording information on the film for use during processing.

Through a set 16 of buttons, and by following various operator interface directions on a display screen 18, an operator is able to make various selections. For example, display screen 18 may enter a "print size" selection mode 18a of FIG. 1B, a "sound quality" selection mode 18b of FIG. 1C, or a "type of sound" selection mode 18c of FIG. 1D. These inputs do not effect the recording of the sound, however they do provide inputs to a microcontroller 20, shown in FIG. 2, which controls recording such that a determination can be made as to the maximum permissible sound recording length. In addition, the inputs can be stored along with the sound to aid in the selection of formatting and sound compression algorithms. The "type of sound" input may be especially useful in this regard. In any case, once these inputs are gathered, microcontroller 20, using a simple look-up table or calculation, determines the recording length, and alters display screen 18 to a "recording time" display mode 18d having a countdown view 21; see FIG. 1E.

Assuming that the camera is APS, the desired format is selected at Step 30 by setting selector switch 14 to "C", "H", or P, as appropriate, and the picture is taken by pressing a capture button 34. Once a picture is taken, display screen 18, under the control of microcontroller 20 will display the print size selector view 18a. Using the appropriate one of camera button set 16, the operator can enter his or her choice of print sizes (choices could be 4×6, 5×7, or 8×10 for example) at Step 36 of FIG. 3. In APS cameras, the operator would be presented with different size ratios in this screen because the print format option is integrated into the camera and is chosen before the picture is captured. It will be understood by those skilled in the art that, although the APS camera disclosed herein includes display screen 18, choice of sound quality and/or type, and a simple record/stop interface, these features are not required to practice the present invention.

After the format and print size is selected, the sound quality selector view 18b is presented. On advanced cameras, the selection from this view has a direct correlation to the amount of compression that will occur on the recorded sound. If "good" quality is chosen at Step 38, using the appropriate one of button set 16, the recorded sound will be heavily compressed by the microcontroller. If "better" quality is chosen, then the recorded sound will be moderately compressed. If "best" quality is chosen, minimal compression will be applied to the recorded sound by the microcontroller. On less advanced cameras, the information about sound quality can be stored by the camera to be used late at the photofinisher in the compression and encoding algorithms.

Figure 3:
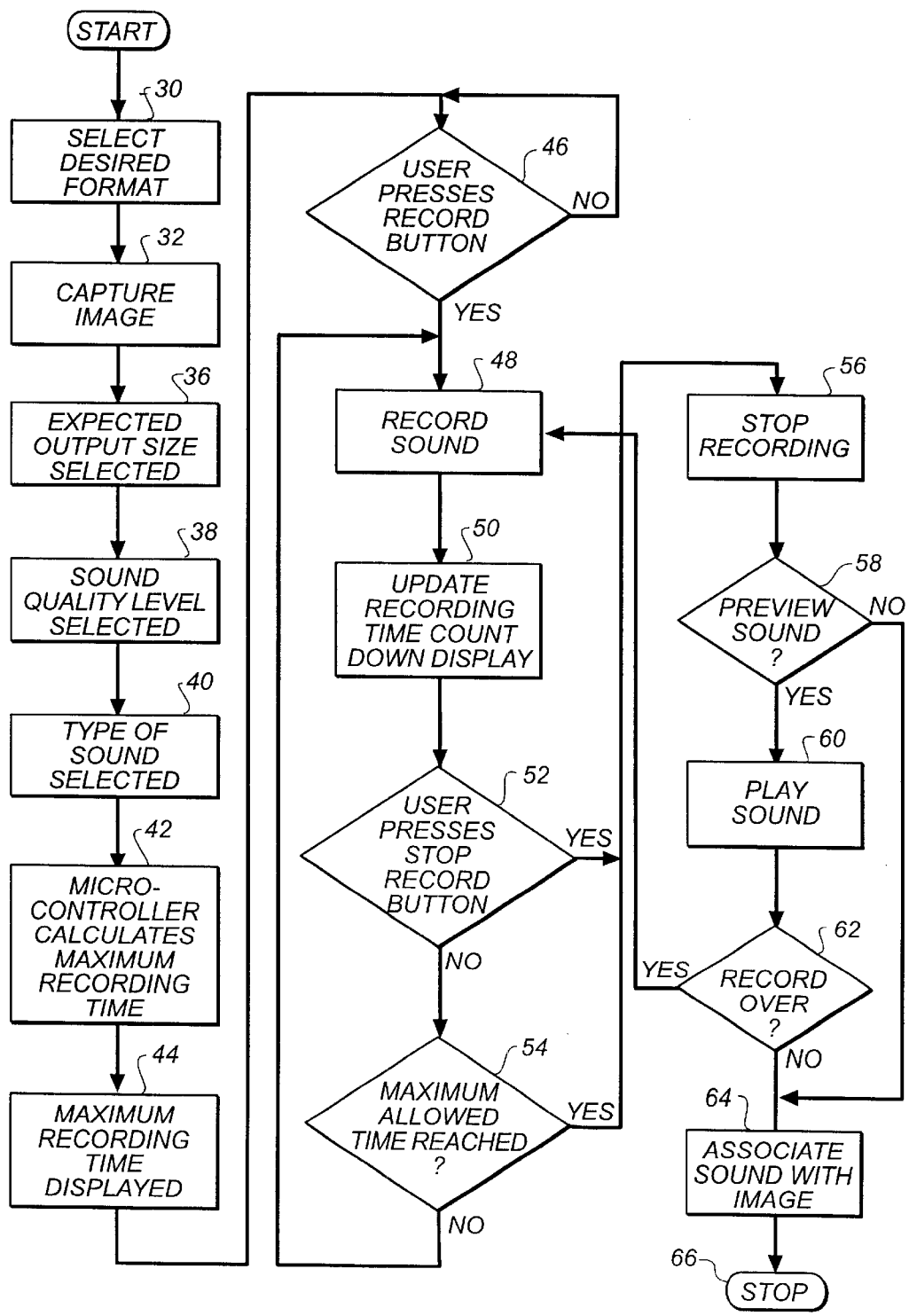

Immediately after an option is chosen from sound quality selector view 18b, the type of sound selector view 18c will be displayed on display screen 18 for selection at Step 40 of FIG. 3. The choices that are available are "voice", "ambient" and "music." The choice of sound to be recorded may dictate the sampling rate at which the record/playback unit will record, if such a feature is present. Voice would have a lower frequency of sampling than music, which will have the highest frequency of sampling executed by microcontroller 20. Ambient setting will effect a moderate frequency of sampling.

Once format, output size, sound quality, and type of sound options have been selected, microcontroller 20 will calculate (Step 42) the amount of recording time in the recording time view 18d. Microcontroller 20 calculates the maximum length of time allowable for sound recording based in part on the position of format selector switch 14 such that the sound file in encoded form will fit on the desired output size with no additional processing of the file. Using the "C" format as a baseline, the nominal additional recording time for an "H" format is 16% of the baseline, and for a "P" format is 83% of the baseline using a simple area calculation. In reality, these figures may be either higher or lower based on the complexities associated with two dimensional encoding. For example, a certain portion of most common encoding formats is dedicated to "header" information, which is a fixed amount of data required for skew correction, formatting, etc. Because this is a fixed amount of overhead, the percentage of increase in recording times would be underestimated.

It is recognized that this calculation may depend on a variety of other system parameters other than those discussed herein. For example, system parameters may include the method of data storage on the print (magnetic, visible barcode, invisible barcode, data hiding), the percentage of print area dedicated to sound storage, the method and level of sound compression, the amount of redundancy built into the storage of the data, and the resolution of the playback device.

In any case, the maximum recording time is then displayed (Step 44) on the recording time views 18d. This display 21 may be a count down liquid crystal display. At this point in the recording routine, the display shows the maximum recording time, and is waiting until the operator presses the record button of button set 16 (Step 46). When the record button is pressed, microcontroller 20 signals voice play/record chip 22 (such as the Information Storage Devices Inc. of San Jose, Calif. Model ISD2564 recording chip) to start recording. The input for the recording is microphone 12 that is on the back of the camera. Now, sound recording begins (Step 48). Recording count down display 21 is updated appropriately to show the revised amount of time available for continued recording (Step 50). This process continues until such time as either the operator terminates the recording (Step 52) by pressing the stop record button of button set 16, or the maximum allowable time has been reached (Step 54).

When recording stops (Step 56), the operator is given the option to preview the sound (Step 58) of FIG. 1F. If desired, the recorded sound is played through speaker 24 (Step 60). If the operator is unhappy with the sound recording, there is a provision to re-record the sound (Step 62). After a satisfactory recording has been made, the sound is associated with an image (Step 64) in one of the many known ways (such as disclosed in aforementioned U.S. Pat. No. 5,128, 700), and the routine terminates (Step 66).

What is claimed is:

1. Apparatus for recording individual sound files to be re-recorded onto associated photographic prints, said apparatus comprising:

an operator interface for pre-selecting photographic print characteristics which would affect the amount of recording time available on an associated photographic print;

audio memory adapted to store sound files to be re-recorded onto associated photographic prints; and an indicator adapted to provide an operator-recognizable indication of recording time available as a function of print characteristics pre-selected by an operator.

2. A camera for recording individual sound files to be re-recorded onto associated photographic prints, said camera comprising:

an operator interface for pre-selecting photographic print characteristics which would affect the amount of recording time available on an associated photographic print;

audio memory adapted to store sound files to be re-recorded onto associated photographic prints; and an indicator adapted to provide an operator-recognizable indication of recording time available as a function of print characteristics pre-selected by an operator.

3. A camera for recording individual sound files to be re-recorded onto associated photographic prints, said camera comprising:

an operator interface for pre-selecting photographic print characteristics which would affect the amount of recording time available on an associated photographic print;

audio memory adapted to store sound files to be re-recorded onto associated photographic prints; and an indicator adapted to provide an operator-recognizable indication of recording time available as a function of print characteristics pre-selected by an operator.

4. A camera for recording individual sound files as set forth in claim 3, wherein said print characteristics include a print's two-dimensional surface area.

5. A camera for recording individual sound files as set forth in claim 3, wherein said print characteristics include a print's shape.

6. A camera for recording individual sound files as set forth in claim 5, wherein said print's shape is selected from standard APS formats.

7. A camera for recording individual sound files as set forth in claim 3, wherein said print characteristics include a sound file's type.

8. A camera for recording individual sound files as set forth in claim 7, wherein said sound file's type is selected from music, ambient sound, and annotation.

9. A camera for recording individual sound files as set forth in claim 3, wherein said print characteristics include sound quality.

10. A camera for recording individual sound files as set forth in claim 3, wherein the operator interface is adapted for pre-selection of print characteristics on an image frame by image frame basis.

11. A photographic system for producing prints from photographic film having sound files associated with image frames of the film, said photographic system comprising:

a camera adapted to record sound files to be re-recorded onto associated photographic prints, said camera comprising:

an operator interface for pre-selecting photographic print characteristics which would affect the amount of recording time available on an associated photographic print;

audio memory adapted to store sound files to be re-recorded onto associated photographic prints; and an indicator adapted to provide an operator-recognizable indication of recording time available as a function of print characteristics pre-selected by an operator; and a photofinishing system for processing the film and producing prints therefrom, said photofinishing system comprising apparatus for recording sound files on the associated photographic prints.

12. A process for recording individual sound files to be re-recorded onto associated photographic prints, said process comprising the steps of:

pre-selecting photographic print characteristics which would affect the amount of recording time available on an associated photographic print; storing sound files to be re-recorded onto associated photographic prints; and providing an operator-recognizable indication of recording time available as a function of print characteristics pre-selected by an operator.

* * * * *